United States Patent [19]

Kuo

[11] Patent Number: 5,714,207
[45] Date of Patent: Feb. 3, 1998

[54] METHOD OF LASER TEXTURING GLASS OR GLASS-CERAMIC SUBSTRATES FOR MAGNETIC RECORDING MEDIA

[75] Inventor: David Kuo, Castro Valley, Calif.

[73] Assignee: Seagate Technology, Inc., Scotts Valley, Calif.

[21] Appl. No.: 796,830

[22] Filed: Feb. 6, 1997

[51] Int. Cl.[6] ..................................... B05D 3/00
[52] U.S. Cl. ................ 427/555; 427/128; 427/131; 427/132; 427/272.2; 427/309; 427/314; 427/444; 427/596
[58] Field of Search ..................... 427/127–132, 427/555, 596, 309, 314, 272.2, 444

[56] References Cited

U.S. PATENT DOCUMENTS

| | | | |
|---|---|---|---|
| 5,370,912 | 12/1994 | Bigelow et al. | 427/575 |
| 5,492,775 | 2/1996 | Ahlert et al. | 428/694 T |
| 5,550,696 | 8/1996 | Nguyen | 360/135 |
| 5,567,484 | 10/1996 | Baumgart et al. | 427/555 |
| 5,582,878 | 12/1996 | Ogawa et al. | 427/554 |
| 5,586,040 | 12/1996 | Baumgart et al. | 364/474.08 |
| 5,595,768 | 1/1997 | Treves et al. | 425/174.4 |
| 5,595,791 | 1/1997 | Baumgart et al. | 427/554 |

*Primary Examiner*—Bernard Pianalto
*Attorney, Agent, or Firm*—Lowe, Price, LeBlanc & Becker

[57] ABSTRACT

The height of protrusions formed during laser texturing a glass or glass-ceramic substrate is controlled by controlling the quench rate of the protrusions during resolidification. In an embodiment, the quench rate is controlled by heating the substrate during laser texturing. Heating can be initiated prior or subsequent to, or simultaneously with, initial exposure of the substrate surface to a pulsed, focused $CO_2$ laser beam for texturing.

19 Claims, 2 Drawing Sheets

METHOD OF LASER TEXTURING GLASS OR GLASS-CERAMIC SUBSTRATES FOR MAGNETIC RECORDING MEDIA

TECHNICAL FIELD

The present invention relates to the recording, storage and reading of magnetic data, particularly rotatable magnetic recording media, such as thin film magnetic disks having textured surfaces for contact with cooperating magnetic transducer heads. The invention has particular applicability to high density magnetic recording media for mobile computer data storage applications.

BACKGROUND ART

Thin film magnetic recording disks and disk drives are conventionally employed for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a toughened recording surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

A typical magnetic recording medium is depicted in FIG. 1 and comprises a substrate 10, typically an aluminum (Al)-base alloy, such as an aluminum-magnesium (Al-Mg) alloy, plated with a layer of amorphous nickel-phosphorous (NiP). Substrate 10 typically contains sequentially deposited thereon a chromium (Cr) or Cr-alloy underlayer 11, a magnetic layer 12 which is usually a cobalt (Co)-base alloy, a protective overcoat 13 which usually comprises carbon, a lubricant topcoat 14. Cr or Cr-alloy underlayer 11, Co-base alloy magnetic layer 12 and protective carbon overcoat 13 are typically deposited by sputtering techniques. A conventional Al-alloy substrate is provided with a NiP plating primarily to increase the hardness of the Al substrate, serving as a suitable surface for polishing to provide the requisite surface roughness or texture, which is intended to be substantially replicated on the disk surface.

The escalating requirements for high areal recording density impose increasingly greater requirements on thin film magnetic media in terms of coercivity, stiction, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head renders it particularly difficult to satisfy the requirements for controlled texturing to avoid head crash.

Conventional techniques for providing a disk substrate with a textured surface comprise a mechanical operation, such as polishing. See, for example, Nakamura et al., U.S. Pat. No. 5,202,810. Conventional mechanical texturing techniques are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. In addition, various desirable substrates are difficult to process by mechanical texturing. This undesirably limiting facet of mechanical texturing, virtually excludes the use of many materials for use as substrates.

An alternative texturing technique to mechanical texturing comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. The laser texturing technique disclosed by Baumgart et al. employs a single focusing lens, and the shape of the resulting protrusions are shown to be altered by adjusting the pulse energy. At low pulse energies, the bump or protrusion shape comprises a central depression and a surrounding rim, similar to that reported by Ranjan et al. As the pulse energy is increased, the bottom of the depression flattens into a rounded, smooth, central dome resembling a "sombrero." At higher powers, the central dome broadens and decreases in height to eventually become equal to or lower than the rim.

In copending application Ser. No. 08/666,374 filed on Jun. 27, 1996 a laser texturing technique is disclosed employing a multiple lens focusing system for improved control of the resulting topographical texture. In copending application Ser. No. 08/666,374 filed on Jun. 27, 1996, a laser texturing technique is disclosed wherein a pulsed, focused laser light beam is passed through a crystal material to control the spacing between resulting protrusions.

Conventional laser texturing techniques have previously been applied to metal-containing substrates or substrates having a metal-containing surface, such as Ni-P plated Al or Al-base alloys. Such substrates, however, exhibit a tendency toward corrosion and are relatively deformable, thereby limiting their utility so that they are not particularly desirable for use in mobile computer data storage applications, such as laptop computers. Glass and glass-ceramic substrates exhibit superior resistance to shock than Ni-P coated Al or Al-alloy substrates. Accordingly, glass and glass-ceramic substrates are desirable candidates for use in mobile computer data storage applications. However, it is extremely difficult to provide an adequate texture on a glass or a glass-ceramic substrate, particularly in view of the escalating requirements for high areal recording density.

Conventional practices for texturing a glass or glass-ceramic substrate comprise heat treatment. Goto et al., U.S. Pat. No. 5,391,522, discloses a glass ceramic substrate suitable for use in a magnetic recording medium. A textured surface is provided by heat treatment, during which the recrystallization temperature is maintained for about 1 to about 5 hours to generate secondary crystal grains forming the surface texture characterized by irregular protrusions with surrounding valleys extending into substrate.

Hoover et al., U.S. Pat. No. 5,273,834 discloses the use of alternate substrates, such as glass-ceramic substrates. The substrate material is provided with ions for absorbing radiation in the near infrared portion of the spectrum, thereby rendering the material capable of attaining elevated temperatures during film deposition.

The use of heat treatment to form a textured surface on alternate substrates, such as glass or glass-ceramic substrates, is undesirably slow and inefficient in terms of energy consumption. Significantly, it is extremely difficult to exercise control over the size and shape of the secondary crystal grains due to inherent limitations in controlling temperature uniformity. Accordingly, it is virtually impossible to provide a glass or glass-ceramic substrate with a controlled textured landing zone for optimizing flying height and maximizing data zone recording density. Moreover, the resulting texture comprises irregularly shaped protrusions with surrounding valleys extending into the substrate, thereby creating undesirable stress profiles during subsequent deposition of layers by sputtering at elevated temperatures. Such undesirable stress profiles render it extremely difficult to accurately replicate the texture in subsequently deposited layers.

In copending PCT application Serial No. PCT/US96/06830, a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., in an article entitle "Laser Zone Texturing on Glass and Glass-Ceramic Substrates," presented at The Magnetic Recording Conference (TMRC), Santa Clara, Calif., Aug. 19–21, 1996.

There remains a need for a magnetic recording medium comprising a glass or glass-ceramic substrate having an accurately controlled texture, and for a method of laser texturing a glass or glass-ceramic substrate wherein the height of the protrusions extending above the substrate surface is controlled.

DISCLOSURE OF THE INVENTION

An object of the present invention is a method of accurately texturing a glass or glass-ceramic substrate to provide a controllable topography.

Another object of the present invention is a method of laser texturing a glass or glass-ceramic substrate and controlling the height of the resulting protrusions formed on the substrate surface.

Additional objects, advantages and other features of the invention will be set forth in the description which follows and in part will become apparent to those having ordinary skill in the art upon examination of the following or may be learned from the practice of the invention. The objects and advantages of the invention may be realized and obtained as particularly pointed out in the appended claims.

According to the present invention the foregoing and other objects are achieved in part by a method of manufacturing a magnetic recording medium, which method comprises: texturing a surface of a glass or glass-ceramic substrate with a pulsed, focused laser light beam to form a plurality of protrusions on and extending above the substrate surface; and controlling the height of the protrusions by controlling the quench rate during resolidification of the laser formed protrusions.

Another aspect of the present invention is a method of manufacturing a magnetic recording medium, which method comprises: texturing a surface of a glass or glass-ceramic substrate with a pulsed, focused laser light beam to form a plurality of protrusions on and extending above the substrate surface; and controlling the height of the protrusions by heating the substrate to reduce the quench rate during resolidification of the laser formed protrusions.

Additional objects and advantages of the present invention will become readily apparent to those skilled in the art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
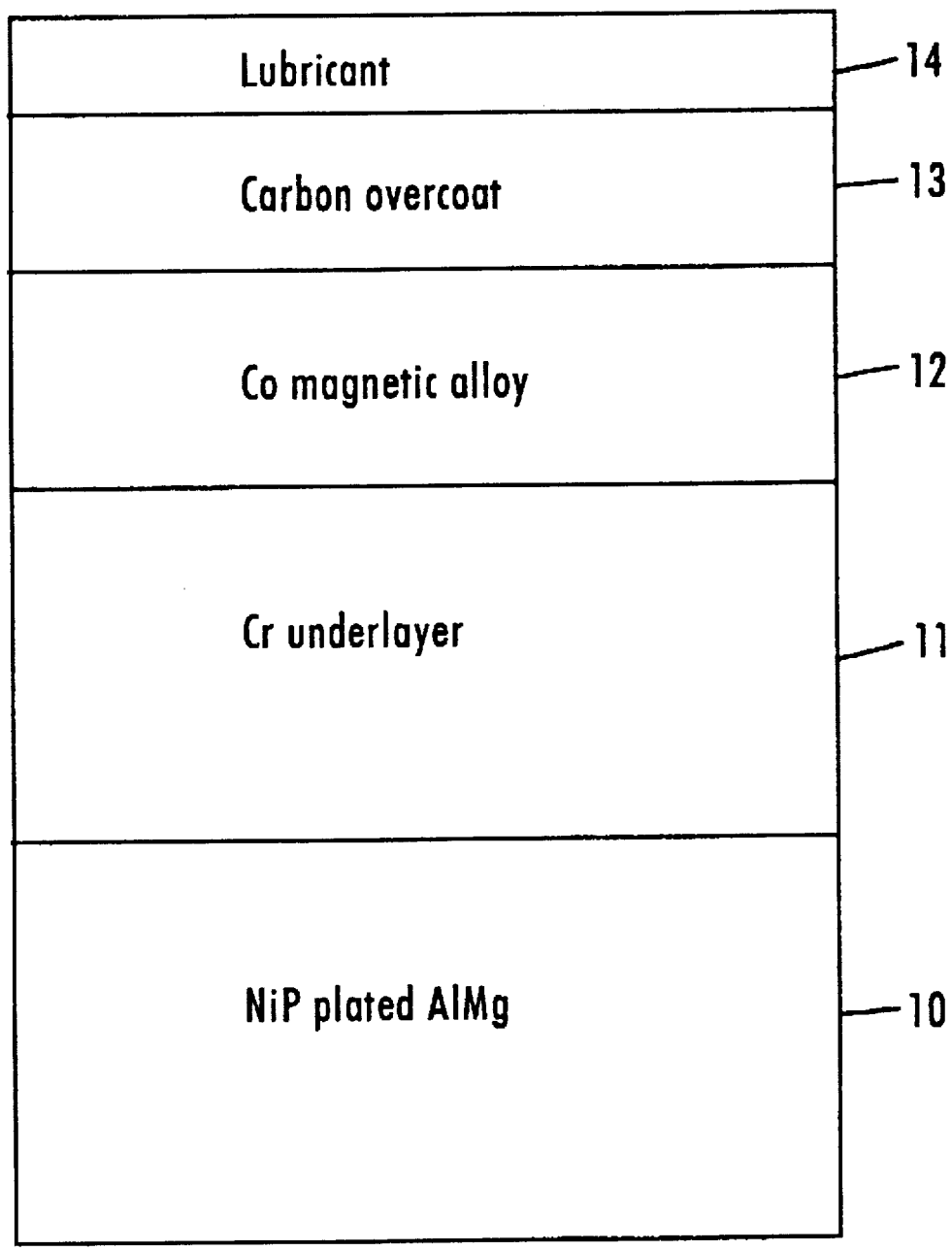
FIG. 1 schematically depicts a conventional magnetic recording medium structure.

In laser texturing a glass or glass-ceramic substrate, as with a $CO_2$ laser, the resulting textured topography comprises a plurality of rounded protrusions extending above the substrate surface, without surrounding valleys extending substantially into the substrate as in texturing a metal-containing surface, such as an NiP plated Al or Al-alloy substrate. Such relatively uniform protrusions improve the tribological performance of the resulting magnetic recording medium. However, the height of the protrusions is one of the most critical parameters in that it directly impacts glide and tribological performance. Accordingly, the present invention comprises a method of laser texturing a glass or glass-ceramic substrate wherein the height of the resulting protrusions extending above the substrate surface is controlled to optimize glide and tribological performance.

After considerable experimentation and investigation, it was found that a net volume gain is experienced in forming laser protrusions (bumps) on glass or glass-ceramic substrates; whereas, laser protrusions formed on NiP/Al substrates typically exhibit a negligible volume change. It was also found that the height of laser protrusions formed on a glass or glass-ceramic substrate is extremely sensitive to pulse energy. In accordance with the present invention, the height of laser generated protrusions is controlled by controlling the quench rate during laser texturing, i.e., during resolidification of the laser formed protrusions. In an embodiment of the present invention, the quench rate is controlled by heating the region of the substrate surface undergoing laser texturing. Heating of the substrate surface can be initiated prior to, simultaneously with, or subsequent to exposing the substrate to a laser light beam for texturing. Heating can be effected by any conventional means, as by an external heating source, e.g., a radiant heater, or by employing a laser beam. Heating of the substrate surface can be discontinued subsequent to resolidification of the laser formed protrusions.

Thus, in accordance with the present invention, the bump height or protrusion height of laser formed protrusions during laser texturing of a glass or glass-ceramic substrate is controlled to less than about 150 nm, preferably less than about 30 nm, e.g., to within a range of about 3 nm to about 30 nm, by heating the substrate during laser texturing. The temperature to which the substrate is heated depends upon the particular substrate material. It has been found suitable to heat the substrate to a temperature less than the reflow temperature of the particular substrate material. Most glass materials suitable for use as a non-magnetic substrate in a magnetic recording medium have a reflow temperature of about 600° C. to about 615° C. Accordingly, in laser texturing a glass substrate for a magnetic recording medium, it has been found suitable to typically heat the substrate in proximity to the area of the substrate undergoing laser texturing at a temperature up to about 615° C., for example, at a temperature between about 100° C. to about 615° C.

Most glass-ceramic substrates suitable for use as a substrate in a magnetic recording medium have a reflow temperature of about 700° C. to about 750° C. Accordingly, in laser texturing a glass-ceramic substrate in accordance with the present invention by controlling the height of the protrusions, it has been found suitable to typically heat the substrate to a temperature up to about 750° C. as, for example, at a temperature between about 100° C. and about 750° C., during laser texturing.

During laser texturing of a glass or glass-ceramic substrate, a minute portion of the substrate is melted and a dome-shaped bump grows in height and size. As pulse energy increases, the dome-shaped bumps grow and the dome gradually flattens out and eventually collapses to form crater-shaped bumps at elevated pulse energy. Once the protrusion has resolidified, it is not necessary to continue application of heat in that quenching is essentially completed. The present invention focuses upon controlling the bump/protrusion height, i.e., minimizing the bump/protrusion height sensitivity to laser power variation by lowering the quench rate during resolidification of the laser formed protrusions. In addition, the inventive method also reduces the pulse energy required to form protrusions with a specific height. Consequently, higher throughput is achieved with same laser power. This can be efficiently achieved by applying heat to the substrate during protrusion formation.

The exact mechanism operative which enables the protrusion height to be minimized by lowering the quench rate during resolidification of the laser formed protrusions is not known with certainty. However, it is believed that a reduced quenching rate, i.e., a lower cooling rate, increases the density of the individual protrusion and, hence, results in a decrease in the protrusion height in that the protrusion is provided with sufficient time to settle. In practicing the claimed invention, one having ordinary skill in the art can easily optimize the temperature to which the substrate is heated as well as the duration of heating, dependent upon the particular substrate material employed, given the objectives of the present invention.

Figure 2:
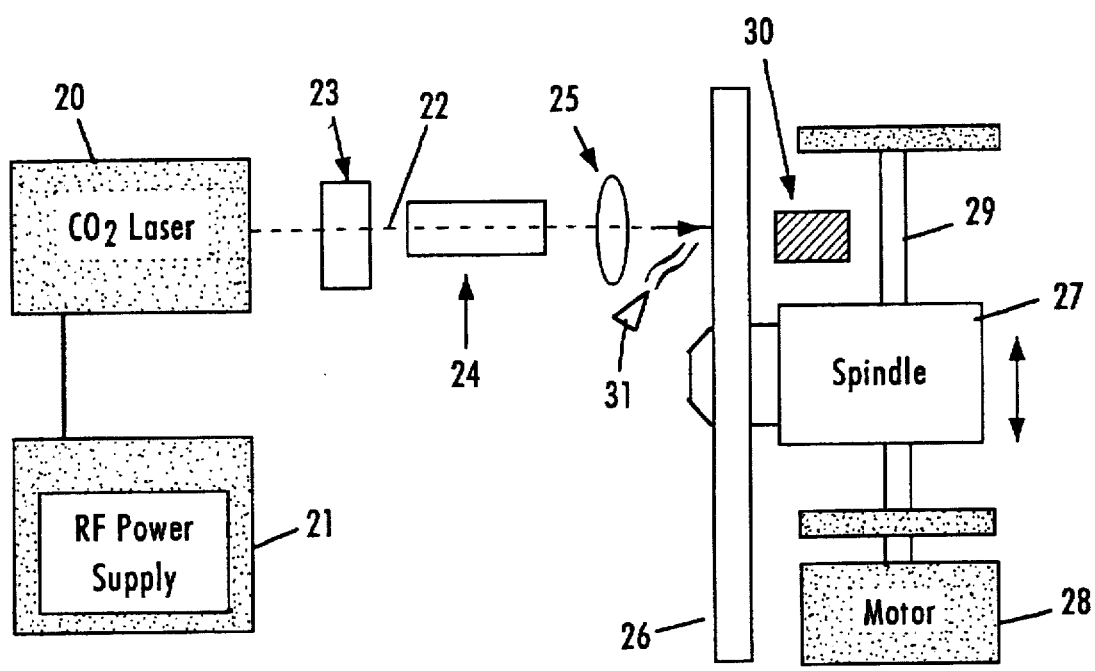
FIG. 2 schematically depicts a laser texturing system in accordance with an embodiment of the present invention.

The inventive method can be practiced employing the apparatus schematically depicted in FIG. 2 which comprises a $CO_2$ laser 20 pulsed by RF driver 21. An alternative way is to utilize a CW $CO_2$ laser with an external AO modulator to split the laser beam. Emitted laser light beam 22 passes through variable beam attenuator 23 and beam expander 44. Expanded laser light beam 22 is then focused by lens 25 onto the surface of substrate 26 which is driven by spindle 27 powered by motor 28. Substrate 26 and spindle 27 are mounted on a linear slide 29. A thermopile detector 30 measures the average laser power, which can be easily translated into pulse energy.

In accordance with the present invention, the surface of the substrate undergoing laser texturing is heated during laser texturing in order to control the height of the laser formed protrusions. Such heating can be effected by radiant heater 31 shown in FIG. 2. In another embodiment of the present invention, the laser beam is split into first and second laser sub-beams. The first laser sub-beam is expanded and directed to heat the substrate surface undergoing laser texturing. The second laser sub-beam is focused onto the substrate to effect laser texturing while the substrate surface is being heated by the expanded first laser sub-beam. The inventive method can be employed to accurately form a landing zone with improved tribological performance by virtue of the precisely controlled uniform protrusions having a controlled height extending above the substrate surface.

Consistent with conventional practices, opposite surfaces of a glass or glass-ceramic substrate can be laser textured in accordance with the present invention. The present invention enables accurate control of the height of laser formed protrusions, thereby optimizing tribologic and magnetic requirements compatible with the escalating requirements for high areal density and mobile computer data storage applications, such as laptop computers. In practicing the present invention, conventional and commercially available glass or glass-ceramic substrates can be employed, such as O'Hara glass. The substrate is initially polished to provide a specular surface and a landing zone accurately formed thereon by the inventive laser texturing technique, leaving a specular data zone with maximized areal recording density.

The magnetic layers deposited in accordance with the present invention can be any of those conventionally employed in the production of magnetic recording media. Such conventional magnetic alloys, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100Å to about 1000Å, such as 200Å to about 500Å, has been found suitable.

As in conventional practices, an underlayer can be deposited on the textured substrate prior to depositing the magnetic layer. The underlayer can comprise chromium or a chromium-alloy, such as chromium-vanadium or chromium-titanium, oxygen-doped chromium, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention can be employed to produce any of various types of magnetic recording media including thin film disks, with an attendant improvement in flying stability, glide performance and head-medium interface reliability. Moreover, the precise manner in which a landing zone is laser textured enables increased areal recording density, e.g., an increase of 40% or more, and a reduction in the size of head sliders.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A method of manufacturing a magnetic recording medium, which method comprises:
   texturing a surface of a glass or glass-ceramic substrate with a pulsed, focused laser light beam to form a plurality of protrusions on and extending above the substrate surface; and
   controlling the height of the protrusions by controlling the quench rate during resolidification of the laser formed protrusions.

2. The method according to claim 1, comprising controlling the height of the protrusions by heating the substrate apart from and during laser texturing to reduce the quench rate.

3. The method according to claim 2, comprising:
   applying heat to the substrate prior or subsequent to, or simultaneously with, initially exposing the substrate surface to the pulsed, focused laser light beam to melt and resolidify portions of the substrate to form a plurality of protrusions; and
   discontinuing heating the substrate after the protrusions have resolidified.

4. The method according to claim 2, comprising heating the substrate to a temperature up to the reflow temperature of the substrate during laser texturing.

5. The method according to claim 4, comprising heating the substrate to a temperature up to about 650° C. during laser texturing, wherein the substrate comprises a glass material.

6. The method according to claim 5, comprising heating the glass substrate to a temperature between about 100° C. and about 615° C. during laser texturing.

7. The method according to claim 4, comprising heating the substrate to a temperature up to about 750° C., wherein the substrate comprises a glass-ceramic material.

8. The method according to claim 7, comprising heating the glass-ceramic substrate to a temperature between about 100° C. and about 750° C. during laser texturing.

9. The method according to claim 2, comprising heating the substrate by radiant heat.

10. The method according to claim 2, comprising heating the substrate by exposing the substrate to a laser light beam.

11. The method according to claim 10, comprising:
    generating a laser light beam;
    splitting the generated laser light beam into first and second laser sub-beams;
    expanding the first laser sub-beam;
    focusing the second laser sub-beam;
    directing the expanded first laser sub-beam on the substrate surface to heat the substrate; and
    exposing the heated substrate to the focused second laser sub-beam to texture the substrate surface.

12. The method according to claim 2, wherein the substrate surface is textured with a laser light beam derived from a $CO_2$ laser source.

13. The method according to claim 2, comprising rotating the substrate during laser texturing.

14. The method according to claim 2, comprising laser texturing a portion of the substrate surface to form a landing zone.

15. The method according to claim 2, further comprising depositing a magnetic layer on the laser textured substrate surface.

16. The method according to claim 15, comprising:
    depositing an underlayer on the laser textured substrate surface; and
    depositing a magnetic layer on the underlayer; wherein the textured surface is substantially replicated on subsequently deposited layers.

17. The method according to claim 1, comprising controlling the height of the protrusions to less than about 150 nm and controlling the quench rate during resolidification of the laser formed protrusions to optimize glide and tribological performance.

18. The method according to claim 17, comprising controlling the height of the protrusions to less than about 30 nm.

19. The method according to claim 18, comprising controlling the height of the protrusions to about 3 nm to about 30 nm.

* * * * *

UNITED STATES PATENT AND TRADEMARK OFFICE
CERTIFICATE OF CORRECTION

PATENT NO. : 5,714,207
DATED : February 3, 1998
INVENTOR(S) : David Kuo

It is certified that error appears in the above-identified patent and that said Letters Patent is hereby corrected as shown below:

On the title page, item [22] should read as follows:

--[22] Filed: Feb. 7, 1997--

Signed and Sealed this

Fourth Day of April, 2000

Attest:

Q. TODD DICKINSON

Attesting Officer

Director of Patents and Trademarks